United States Patent [19]
Krivec

[11] Patent Number: 5,603,643
[45] Date of Patent: Feb. 18, 1997

[54] BOOSTER CLAMP WITH ELASTOMERIC JOINT ELEMENT

[75] Inventor: Bert Krivec, Waukesha, Wis.

[73] Assignee: Snap-on Technologies, Inc., Crystal Lake, Ill.

[21] Appl. No.: 442,687

[22] Filed: May 17, 1995

[51] Int. Cl.$^6$ ....................................................... H01R 11/24
[52] U.S. Cl. ............................. 439/822; 24/499; 24/500; 24/530; 24/555; 81/417
[58] Field of Search .................................. 439/504, 729, 439/822; 81/416, 417; 24/499, 500, 501, 530, 545, 555

[56] References Cited

U.S. PATENT DOCUMENTS

| | | |
|---|---|---|
| 1,753,985 | 4/1930 | Flintermann . |
| 1,954,934 | 4/1934 | Houdaille et al. . |
| 2,912,287 | 11/1959 | Leyenberger . |
| 3,266,758 | 8/1966 | Ormond . |
| 3,360,255 | 12/1967 | Ormond . |
| 3,446,465 | 5/1969 | Niskanen . |
| 3,458,933 | 8/1969 | Rogers . |
| 3,575,070 | 4/1971 | Nichols . |
| 4,040,697 | 8/1977 | Ramsay et al. ................. 439/822 X |
| 4,077,092 | 3/1978 | Basevi ............................. 24/500 X |
| 4,185,523 | 1/1980 | Kreitz ................................... 81/417 |
| 4,316,315 | 2/1982 | Vogelnik . |
| 4,405,184 | 9/1983 | Bahiman . |
| 4,584,508 | 4/1986 | Kobayashi et al. ................ 318/483 |
| 4,609,305 | 9/1986 | Kittell . |
| 4,717,288 | 1/1988 | Finn et al. . |
| 5,044,050 | 9/1991 | Trinkaus ............................... 24/499 |
| 5,061,107 | 10/1991 | Brooks . |
| 5,127,706 | 7/1992 | Clark ................................... 297/217 |
| 5,245,894 | 9/1993 | Undin . |
| 5,295,872 | 3/1994 | Christensson ....................... 439/822 |

*Primary Examiner*—Allan N. Shoap
*Assistant Examiner*—Christopher J. McDonald
*Attorney, Agent, or Firm*—Emrich & Dithmar

[57] ABSTRACT

A booster clamp is provided and includes a first lever having a first planar surface and a second lever pivotally connected to the first lever and having a second planar surface. The booster clamp has a substantially cylindrical pivot joint which includes a substantially cylindrical elastomeric element and first and second substantially planar surfaces substantially parallel to one another, wherein the first planar surface of the joint is connected to the first planar surface of the first lever and the second planar surface of the joint is connected to the second planar surface of the second lever.

18 Claims, 1 Drawing Sheet

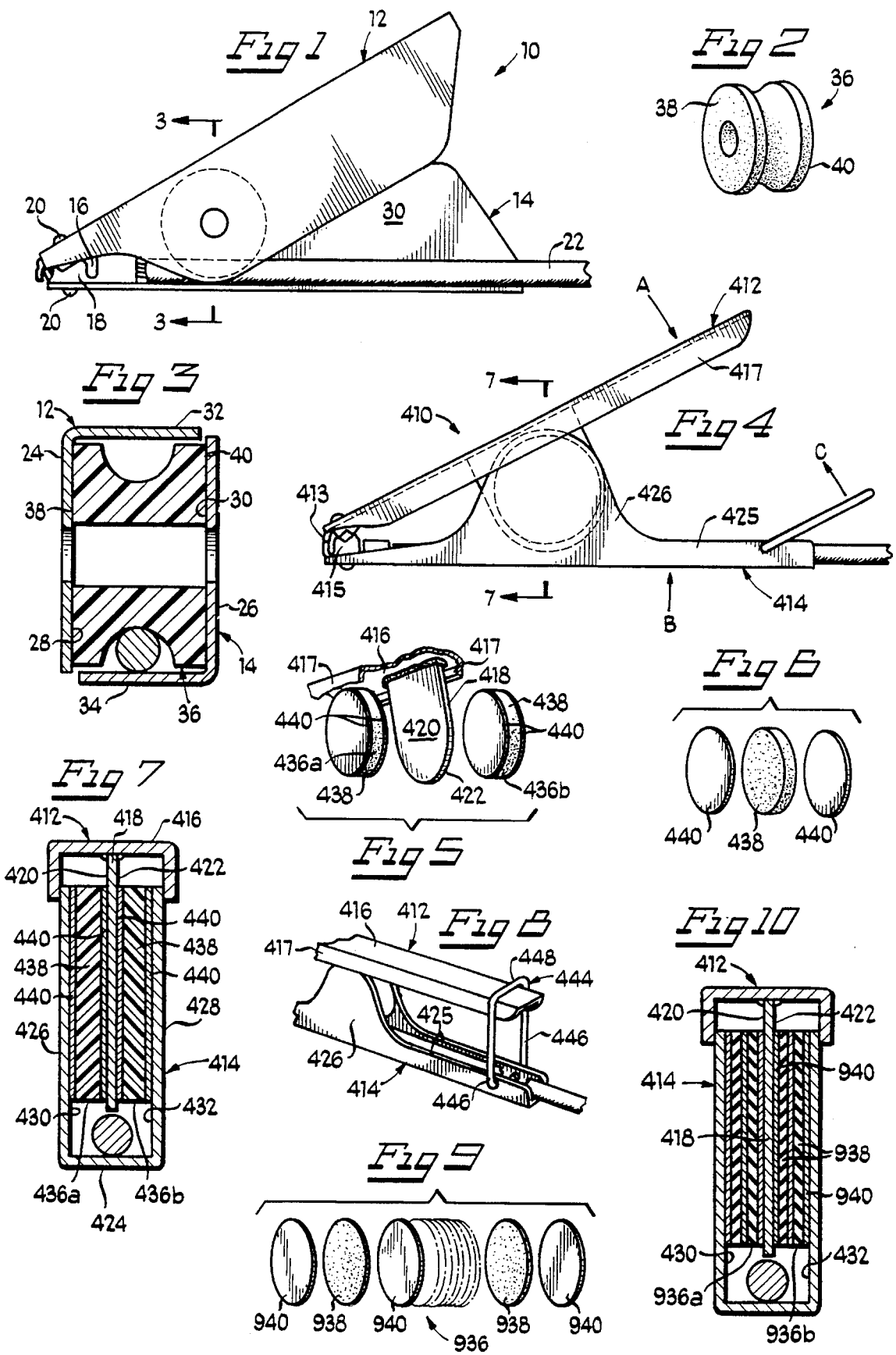

BOOSTER CLAMP WITH ELASTOMERIC JOINT ELEMENT

BACKGROUND OF THE INVENTION

1. Field of the Invention

The present invention relates to battery or booster clamps and, more particularly to joints to pivotally interconnect and pivot the levers of a booster clamp.

2. Description of the Prior Art

Conventional battery or booster clamps typically have two levers, a jaw portion attached to each lever for clamping onto a battery electrode and a joint comprised of a helical spring disposed about a rivet which pivotally connects the two levers of the booster clamp. The spring is adapted to bias the jaw portions of the clamp together to maintain the clamp in a closed position to maintain electrical conductivity with the clamped electrode.

Though this type of joint is widely used, it has several parts which add to the cost and the labor needed to manufacture the clamp. In addition, the joint and the levers of this clamp are made of conductive materials, which is undesirable in many automotive and electrical applications.

As discussed above, the joint biases the clamp to the closed position. A force is therefore necessary to separate the jaw portions from one another to open the clamp and maintain it in its opened position for the time necessary to attach the clamp to the electrode of a battery or other electrical connection point. These clamps are difficult for many people to maintain in the open position.

SUMMARY OF THE INVENTION

It is a general object of the invention to provide an improved booster clamp which avoids the disadvantages of prior clamps while affording additional structural and operational advantages.

An important feature of the invention is the provision of a booster clamp which is of a relatively simple and economical construction.

A still further feature of the invention is the provision of an apparatus of the type set forth which is made of substantially non-conductive materials.

Yet another feature of the invention is the provision of a booster clamp of the type set forth which can be maintained in its open position without the need for continued manual force being applied to the levers of the clamp.

These and other features of the invention are attained by providing a booster clamp including a first lever having a first planar surface and a second lever having a second planar surface. The booster clamp also includes a substantially cylindrical joint pivotally interconnecting the first and second levers. The joint includes a substantially cylindrical elastomeric element and first and second substantially planar surfaces substantially parallel to one another, wherein the first planar surface of the joint member is connected to the first planar surface of the first lever and the second planar surface of the joint is connected to the second planar surface of the second lever.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

FIG. 1 is a side elevational view of a booster clamp with the elastomeric joint member shown in phantom;

FIG. 2 is a perspective view of the elastomeric joint member of FIG. 1;

FIG. 3 is an enlarged sectional view taken generally along the line 3—3 in FIG. 1;

FIG. 4 is a side elevation view of an alternative booster clamp including two elastomeric joint members;

FIG. 5 is an exploded fragmentary perspective view of the two elastomeric joint members of FIG. 4 and the portion of an upper lever to which they are attached;

FIG. 6 is an exploded perspective view of one of the elastomeric joint members of FIG. 5;

FIG. 7 is an enlarged sectional view taken generally along the line 7—7 in FIG. 4;

FIG. 8 is a fragmentary perspective view of the rear portion of the clamp of FIG. 4, illustrating the clamp locked in an open position;

FIG. 9 is an exploded perspective view of an alternative elastomeric joint member; and FIG. 10 is an enlarged sectional view similar to FIG. 7, illustrating a clamp employing two elastomeric joint members of FIG. 9.

DETAILED DESCRIPTION OF THE PREFERRED EMBODIMENTS

As seen in FIG. 1, a battery or booster clamp 10 is provided. The booster clamp 10 includes an upper lever 12 and a lower lever 14 pivotally connected to the upper lever 12. The upper and lower levers 12, 14 have first and second jaw portions 16, 18, respectively, connected by rivets 20 thereto. The second jaw portion 18 is connected to a cable 22, which can be connected to a second booster clamp or other electrical connection (not shown).

As seen best in FIG. 3, the upper and lower levers 12, 14 are identical and respectively include generally planar first walls 24, 26 having planar inner surfaces 28, 30 and second walls 32, 34 substantially normal and integral with the vertical walls 24, 26. As best seen in FIG. 3, disposed between vertical wall 24 and vertical wall 26 is an elastomeric joint member 36.

As best seen in FIGS. 2 and 3, the elastomeric joint member 36 is generally cylindrical having an axial bore therethrough and is made of an elastomeric, non-conductive material, such as polyurethane or rubber. Depending on the application, the elastomeric material can have a different hardness, and be resistant to specific materials, such as oil, grease or other specific chemicals.

The elastomeric joint member 36 includes first and second substantially planar annular surfaces 38, 40. The first planar surface 38 of the elastomeric joint member 36 is vulcanized to the inner planar surface 28 of the vertical first wall 24 of the upper lever 12 and the second planar surface 40 of the elastomeric joint member 36 is vulcanized to the planar inner surface 38 of the vertical first wall 26 of the lower lever 14. Alternatively, as discussed in greater detail below, the first and second planar surfaces 38, 40 can be vulcanized to metal washers which can be connected by spot welding or the like to the inner surfaces 28, 30 of the levers 12, 14.

Levers 12 and 14 can be made out of metal or a non-conductive plastic. If the levers 12, 14 are plastic and the elastomeric joint member 36 has been vulcanized to the levers, an essentially non-conductive booster clamp can be provided.

As seen in FIG. 1, when the jaw portions 16, 18 are in contact, the booster clamp 10 is in its closed position and elastomeric joint member 36 lies in its normal, undistorted, at-rest position as shown in FIG. 2. When the levers 12 and 14 are squeezed to separate the jaw portions 16, 18, for example, when an object, such as a battery electrode, is to be gripped between the jaw portion 16, 18, elastomeric joint member 36 is torsionally distorted and tends to urge the levers 12, 14 back to the original closed position shown in FIG. 1.

An alternative booster clamp 410 is shown in FIG. 4. Booster clamp 410 includes a metallic upper lever 412 having a first jaw portion 413 and a metallic lower lever 414 having a second jaw portion 415 and pivotally connected to the upper lever 412. The booster clamp 410 is shown in FIG. 4 in its closed position, with jaw portions 413 and 415 in contact with each other.

Referring to FIGS. 5 and 8, the upper lever 412 is a channel-shaped member having a first wall 416 with side flanges 417. Connected to the first wall 416 centrally and substantially normal thereto and parallel to the flanges 417 is wall 418 having a semi-circular distal end. Wall 418 includes first and second generally planar and parallel surfaces 420, 422.

Referring also to FIG. 7, lower lever 414 includes a channel shaped bottom wall 424 having parallel side flanges 425, which respectively have generally part circular lobes defining walls 426, 428 substantially normal to wall 424. The walls 426, 428 have substantially planar inner surfaces 430, 432, respectively.

As best seen in FIGS. 5–7, the booster clamp 410 also includes two elastomeric joint structures 436a, 436b. Each joint structure 436a, 436b includes an elastomeric element 438 made of an elastomeric material, as described above, vulcanized to two metallic washers 440. Joint structures 436a, 436b are disposed between and connected, by spot welding or other conventional means, to the planar inner surfaces 430, 432 of the walls 426, 428 of the lower lever 414, and the planar surfaces 420, 422 of the wall 418 of the upper lever 412, respectively.

Alternatively, like the embodiment shown in FIGS. 1–3, the washers 440 could be removed and the elastomeric elements 438 could be vulcanized directly to wall 418 and to the walls 426, 428, respectively. Additionally, the first and second levers 412, 414 could be made out of either a metal or a plastic.

As seen in FIGS. 4 and 8, the booster clamp 410 also includes a lock mechanism 444 pivotally connected to the flanges 425 of the lower lever 414 by any conventional means. The lock mechanism 444 is a one-piece bail which includes a pair of parallel leg portions 446 integral with and substantially perpendicular to a horizontal bight 448. The bight portion 448 has a length slightly greater than the width of the first wall 416 of the upper lever 412, and the leg portions 446 are respectively pivotally connected to the flanges 425 of the lower lever 414. When the booster clamp 410 is opened to separate jaw portions 413, 415, by moving levers 412 and 414 towards one another, as indicated by arrows A and B in FIG. 4, and maintained in the open position, lock mechanism 444 is moved in the direction of the arrow C shown in FIG. 4 so that the bight portion 448 lies over the first wall 416 of the upper lever 412 to lock the booster clamp 410 in the open position. When the levers 412 and 414 are released, the upper lever 414 contacts the bight portion 448 of the lock mechanism 444, which prevents the levers 412, 414 from moving toward the closed position of the booster clamp 410.

FIGS. 9 and 10 illustrate an alternative elastomeric joint structure 936. The elastomeric joint structure 936 is a laminated structure made up of a plurality of elastomeric disks 938 and a plurality of steel washers 940. Each elastomeric disk 938 is made of an elastomeric material and disposed between and vulcanized to two steel washers 940. The number of laminations can vary dependent upon the application.

The elastomeric disks 938 are generally at least two to three times thicker than the steel washers 940. The steel washers 940 are made as thin as possible, down to 0.015 inches or less. The laminated elastomeric joint members 936 provide a durable joint member which can resist very high axial forces, yet allow the levers to pivot with respect to each other.

As seen in FIG. 10, where like elements are represented with like numerals, elastomeric joint structures 936a, 936b can replace the elastomeric joint structures 436a, 436b shown in FIGS. 4–7 and be attached to the levers 412 and 414. Elastomeric joint structures 936a, 936b are disposed between and have their outer steel washers 940 spot welded, or connected by other conventional means, to the planar inner surface 430, 432 of the walls 426, 428 of the lower lever 414, and the planar surfaces 420, 422 of the wall 418 of the upper lever 412, respectively.

While particular embodiments of the present invention have been shown and described, it will be appreciated by those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

I claim:

1. A booster clamp comprising:

a first lever having a first planar surface and a first jaw portion;

a second lever having a second planar surface and a second jaw portion mateable with the first jaw portion, the booster clamp having a closed position wherein the first and second jaw portions contact each other and an open position wherein the first and second Saw portions do not contact each other; and a substantially cylindrical joint pivotally interconnecting the first and second levers, the joint including a substantially cylindrical elastomeric element and first and second substantially planar surfaces substantially parallel to each other, wherein the first planar surface of the joint is connected to the first planar surface of the first lever and the second planar surface of the joint is connected to the second planar surface of the second lever.

2. The clamp of claim 1, wherein the elastomeric element is vulcanized to both the first planar surface of the first lever and the second planar surface of the second lever.

3. The clamp of claim 2, wherein the first and second levers are constructed of a plastic.

4. The clamp of claim 1, wherein the joint includes first and second steel washers vulcanized to the elastomeric element and connected respectively to the first planar surface of the first lever and the second planar surface of the second lever.

5. The clamp of claim 1, and further comprising means for maintaining the clamp in an open position.

6. The clamp of claim 1, wherein the elastomeric element is positioned to bias the clamp toward the closed position.

7. A booster clamp comprising:

first and second pivotally interconnected levers respectively having first and second mateable jaw portions, the booster clamp having a closed position wherein the first and second jaw portions contact each other and an open position wherein the first and second jaw portions do not contact each other, the first and second levers each having first and second substantially planar and parallel surfaces; and first and second joint structures, each structure having an elastomeric element and first and second substantially planar and parallel surfaces, wherein the first planar surfaces of the elastomeric elements are respectively connected to the first planar surfaces of the first and second levers, and wherein the second planar surfaces of the elastomeric elements are respectively connected to the second planar surfaces of the first and second levers.

8. The clamp of claim 7, wherein the elastomeric elements of the first and second joint structures are respectively vulcanized to the first and second levers.

9. The clamp of claim 7, wherein the first and second levers are constructed of plastic.

10. The clamp of claim 7, wherein each of the first and second joint structures includes first and second steel washers, the first steel washers of the first and second joint structures being respectively connected to the first planar surfaces of the first and second levers, and the second steel washers of the first and second joint structures being respectively connected to the second planar surfaces of the first and second levers.

11. The clamp of claim 7, wherein the first and second planar surfaces of the first lever lie between the first and second planar surfaces of the second lever.

12. The clamp of claim 8, and further comprising means for maintaining the clamp in an open position.

13. A booster clamp comprising:

a first lever having a first planar surface;

a second lever having a first planar surface; and a substantially cylindrical joint structure connected to the first planar surface of the first lever and to the first planar surface of the second lever for pivotally interconnecting the levers, the joint structure including a plurality of steel washers, and a plurality of cylindrical elastomeric elements, wherein each elastomeric element is vulcanized to two of the steel washers.

14. The clamp of claim 13, wherein each steel washer has a thickness less than that of each elastomeric element.

15. The clamp of claim 13, wherein one of the steel washers is connected to the first planar surface of the first lever and another of the steel washers is connected to the first planar surface of the second lever.

16. The clamp of claim 13, wherein each of the first and second levers has a second planar surface, the clamp further comprising a second substantially cylindrical joint structure connected to the second planar surfaces of the first and second levers.

17. The clamp of claim 13, wherein the first lever has a first jaw portion and the second lever has a second jaw portion mateable with said first jaw portion, the booster clamp having a closed position wherein the first and second jaw portions contact each other and an open position wherein the first and second jaw portions do not contact each other.

18. The clamp of claim 17, and further comprising locking means for maintaining the clamp in an open position.

\* \* \* \* \*

UNITED STATES PATENT AND TRADEMARK OFFICE
CERTIFICATE OF CORRECTION

PATENT NO.   : 5,603,643
DATED        : February 18, 1997
INVENTOR(S)  : Bert Krivec It is certified that error appears in the above-indentified patent and that said Letters Patent is hereby corrected as shown below:

Column 4, line 60, "saw" should be --jaw--.

Signed and Sealed this

Thirteenth Day of May, 1997

BRUCE LEHMAN

*Attest:*

*Attesting Officer*          Commissioner of Patents and Trademarks